United States Patent
Gravina

(10) Patent No.: US 11,371,590 B2
(45) Date of Patent: Jun. 28, 2022

(54) GEAR TRANSMISSION FOR AERONAUTICAL APPLICATIONS

(71) Applicant: GE Avio S.r.l., Rivalta di Turin (IT)

(72) Inventor: Michele Gravina, Minervino Murge (IT)

(73) Assignee: GE AVIO S.R.L., Rjivalta di Torino (IT)

( * ) Notice: Subject to any disclaimer, the term of this patent is extended or adjusted under 35 U.S.C. 154(b) by 1037 days.

(21) Appl. No.: 16/019,902

(22) Filed: Jun. 27, 2018

(65) Prior Publication Data

US 2019/0024761 A1    Jan. 24, 2019

(30) Foreign Application Priority Data

Jul. 21, 2017 (EP) .................................. 17425077

(51) Int. Cl.
*F16D 11/14* (2006.01)
*F16H 1/28* (2006.01)
(Continued)

(52) U.S. Cl.
CPC ............ *F16H 3/728* (2013.01); *B60K 17/00* (2013.01); *F16D 11/14* (2013.01); *F16D 13/22* (2013.01);
(Continued)

(58) Field of Classification Search
CPC . F16D 11/14; F16D 1/108; F16H 1/28; F16H 2001/2881; F16H 2001/289; F16H 1/46; F02C 7/36
See application file for complete search history.

(56) References Cited

U.S. PATENT DOCUMENTS 3,686,978 A * 8/1972 Knoblach ................. F16H 1/46
                                                    475/296
4,043,226 A * 8/1977 Buuck ................... B60K 17/046
                                                    475/158
(Continued)

FOREIGN PATENT DOCUMENTS

DE   10 2015 201931 A1    8/2016
EP       1 113 193 A2     7/2001
EP       2 511 500 A2    10/2012

OTHER PUBLICATIONS

Extended European Search Report and Opinion issued in connection with corresponding EP Application No. 17425077.9 dated Mar. 1, 2018.

*Primary Examiner* — Ernesto A Suarez
*Assistant Examiner* — Lillian T Nguyen
(74) *Attorney, Agent, or Firm* — Venable LLP; Michele V. Frank

(57) ABSTRACT

A gear transmission for aeronautical applications including an input shaft rotating about an axis, an output shaft rotating about the axis, and a transfer group for transferring the torque from the input shaft to the output shaft. The transfer group includes a first torque splitting stage, receiving the torque from the input shaft, and a second torque splitting stage, receiving the torque from the first stage. The first stage presents at least one first rotating member and the second stage presents at least one second rotating member. The input shaft and the first rotating member cooperate with one another at respective interaction surfaces. The rotating members cooperate with one another at respective friction surfaces. One of the interaction surfaces has first engagement elements, and another of the interaction surfaces has second engagement elements that are clutch coupled to one another.

9 Claims, 4 Drawing Sheets

(51) Int. Cl.
  *F16H 3/72*   (2006.01)
  *F16D 13/22*  (2006.01)
  *B60K 17/00*  (2006.01)

(52) U.S. Cl.
  CPC .............. *F16H 2001/2872* (2013.01); *F16H 2200/2007* (2013.01)

(56) References Cited

U.S. PATENT DOCUMENTS

| | | |
|---|---|---|
| 5,433,674 A | 7/1995 | Sheridan et al. |
| 6,117,036 A * | 9/2000 | Lanzon ................ B60K 17/344 475/204 |
| 7,591,754 B2 | 9/2009 | Duong et al. |
| 8,096,917 B2 | 1/2012 | Benito |
| 10,605,333 B2 * | 3/2020 | Gravina .................... F16H 1/46 |
| 2009/0227415 A1 | 9/2009 | Beulna |
| 2017/0227091 A1 * | 8/2017 | Shirokoshi ................ F16H 1/28 |
| 2018/0051776 A1 * | 2/2018 | Klein-Hitpass ....... F16H 57/082 |
| 2019/0024755 A1 * | 1/2019 | Gravina .................... F02C 7/36 |

* cited by examiner

GEAR TRANSMISSION FOR AERONAUTICAL APPLICATIONS

FIELD OF INVENTION

The present invention relates to a gear transmission for aeronautical applications, in particular of the type including a planetary gear.

BACKGROUND OF THE INVENTION

In the transport sector, particularly in the motor and aeronautics fields, is generally known transmitting the motion from an input shaft to an output shaft, which can be coupled to a drive unit and a propulsion unit, respectively, for example a propeller, by means of a plurality of gears.

In particular, in the field of aeronautical engines, planetary gears are widely used to transmit the motion and convert power between a turbomachinery (having high speed and low torque) and at least one propulsive member (having high torque and low speed), because they are very effective in achieving this function while keeping weight and overall dimensions contained.

A known solution is illustrated in European patent No. EP1113193 and it relates to a gear transmission comprising an input shaft rotatable around one of its own axes, an output shaft coaxial with said axis and also rotatable around the latter, and a torque transferring group interposed between the input and output shafts. The transfer group comprises a planetary-type gear.

In particular, the planetary gear comprises a pair of sun gears, each of which engages two arrays of satellite gears, respectively, the latter being axially spaced apart from each other and arranged on opposite sides with respect to a plane of symmetry transversal to the above-mentioned axis.

Each array comprises three satellite gears angularly evenly spaced from one another around the respective sun gear and around the above-mentioned axis; the two arrays of satellite gears are supported by a single satellite gear or gear train structure, which is in common to both arrays.

The transfer group defines stages for splitting the load, i.e. the torque from the input shaft; the stages therefore define respective load transmission paths.

The torque is transmitted from the respective sun gear to the satellite gears engaged by said sun gear, in fractions equal to each other, which run through the transmission along respective branches of the corresponding load path.

In this way, the loads transmitted between the teeth of the satellite gears of the planetary gear are lower than the case in which the torque is transmitted to a single array of satellite gears. Thus, a relatively compact solution is obtained, while maintaining the same overall transmission power.

In the configuration of patent No. EP1113193, the torque of the input shaft is transmitted and then split to the two sun gears via two hollow transmission shafts, which are coaxial with the input and output shafts and comprise respective intermediate portions placed one inside the other with a certain clearance in the radial direction. The sun gears are made in one piece on respective adjacent axial ends of said transmission shafts.

The torques resulting from the splitting carried out by means of the two stages subsequently converge on the output shaft, thus merging again with each other. The resulting new torque is thus transmitted to the user, in this case a propeller.

The torque is transmitted from the input shaft to the transfer group (and therefore to the splitting stages) through a friction coupling, in the illustrated case a triple friction flange.

The flange of the coupling integral with the input shaft, first in order with respect to the load transmission direction, transmits all the torque entering from the input shaft to the other two successive flanges relating to the two hollow transmission shafts mentioned above, which then transmit the torque to the two sun gears, respectively, according to a splitting that is a function of the splitting of the stiffness between the two torque paths, the angular alignment accuracy (angular timing) of said sun gears, and the angular spacing between the teeth of the aforesaid sun gears.

In particular, the other two successive flanges of the coupling are formed integrally with the respective hollow transmission shafts and therefore with their respective sun gears. The three flanges of the coupling cooperate with one another at respective friction surfaces coupled frontally.

Due to the centrifugal force, typical of these rotating systems, and as a consequence of the presence of an oil mist in the volume in which the transmission operates, accumulation of oil occurs in the cavities of the above coupling. In order to evacuate this fluid head that is centrifuged against the internal walls of the two cavities, suitable radial drainage passages must be provided at the interface between the flanges. This results in a consequent decrease in the friction coefficient of said surfaces, and in particular of the friction surface that transmits the whole torque from the flange of the input shaft to the flange of the first transmission shaft, i.e. to the flange of the first torque splitting stage.

Therefore, the force transmitted by the coupling being equal, larger friction surfaces are required than when the friction transmission occurs in a dry environment, with consequent greater radial dimensions of said coupling, increased internal centrifugal stresses and decreased relative power density (ratio between the transmitted power and the volume of the coupling).

The object of the present invention is to provide a gear transmission for aeronautical applications, which is highly reliable and allows at least some of the above-mentioned drawbacks related to gear transmissions of the known type to be overcome.

According to the invention, this object is achieved by means of a gear transmission for aeronautical applications as claimed in claim 1.

BRIEF DESCRIPTION OF THE DRAWINGS

For a better understanding of the present invention, a non-limiting embodiment thereof will be described below purely by way of example and with the aid of the accompanying drawings, wherein.

DETAILED DESCRIPTION

Figure 1:
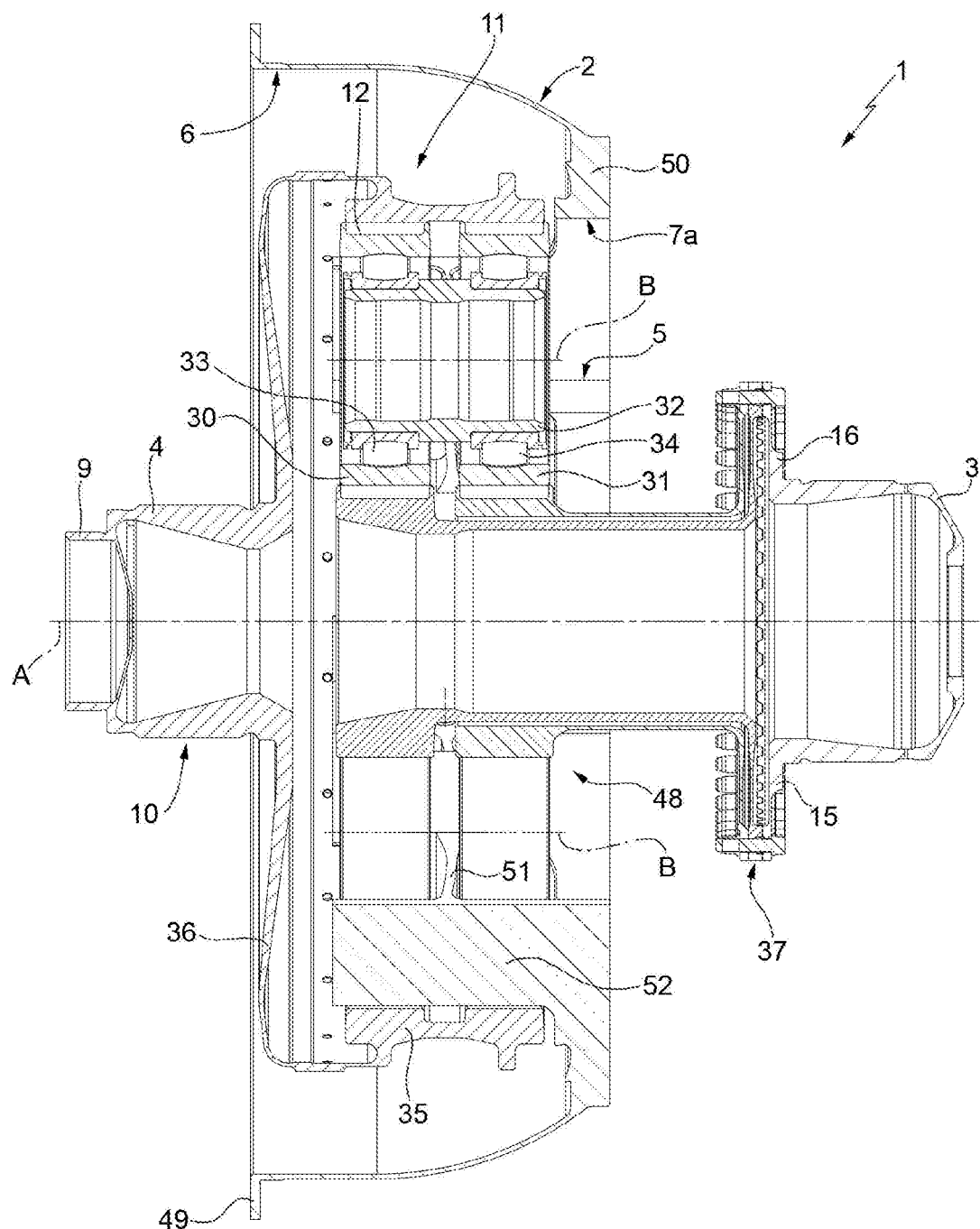
FIG. 1 is an axial section of a gear transmission, according to the present invention, for aeronautical applications.
Figure 5:
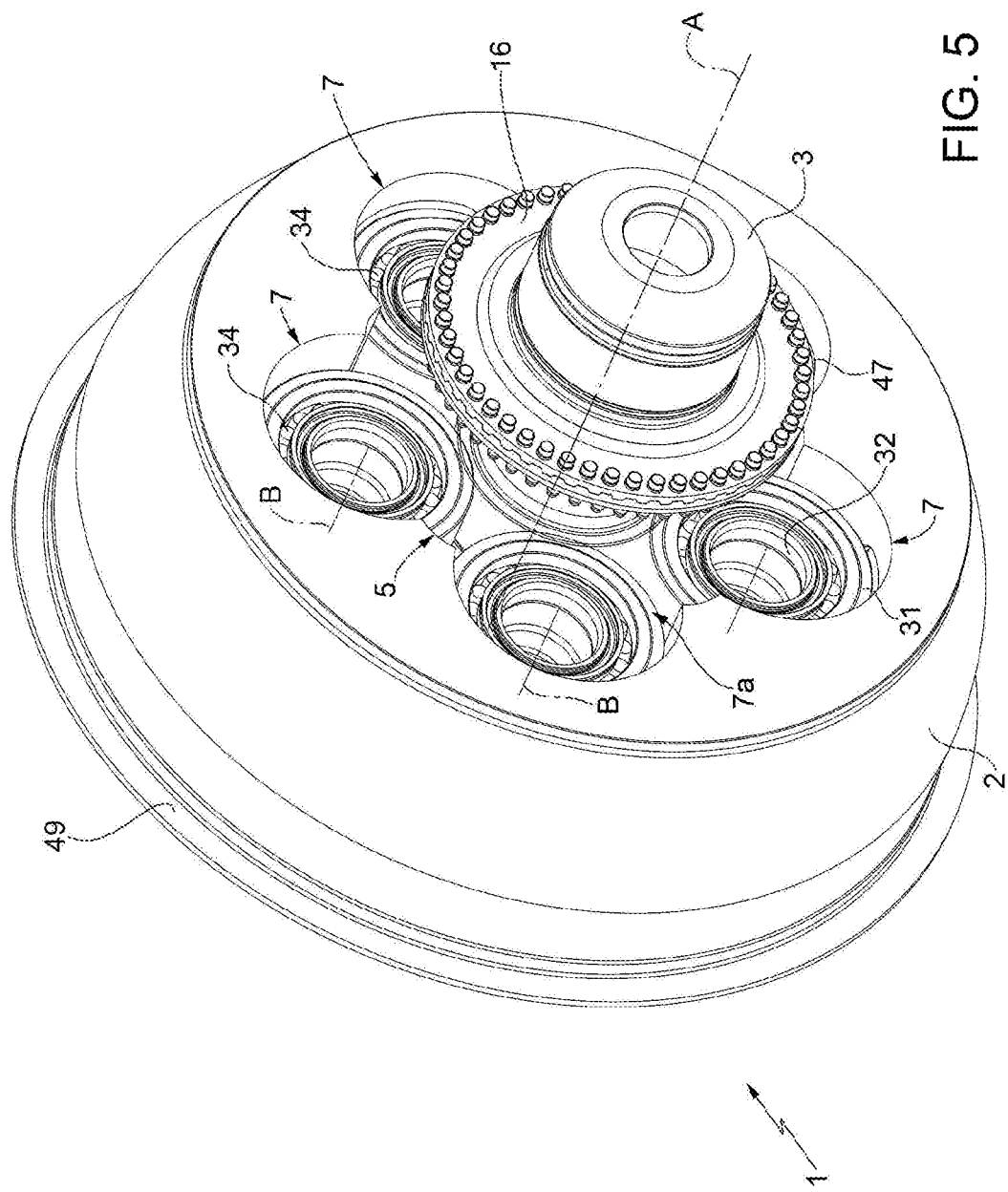
FIG. 5 is a perspective view of the gear transmission of FIG. 1.

With reference to FIGS. 1 and 5, the numeral 1 indicates, as a whole, a gear transmission for aeronautical applications.

The transmission 1 is designed to be interposed between a drive unit, for example a turbomachine (known per se and not shown) and a user (also known per se and not shown), for example a propeller, and comprises:

an input shaft 3, which can rotate about an axis A and be connected to the drive unit in a known manner, not described in detail;

an output shaft 4, which can rotate about said axis A with a different speed than that of the input shaft 3 and be connected to the user in a known manner, not described in detail; and a motion transfer group 8 interposed between the input shaft 3 and the output shaft 4.

The group 8 comprises a planetary gear 48 configured to transmit a torque from the input shaft 3 to the output shaft 4, i.e. a torque delivered by the drive unit and absorbed by the user.

In particular, the planetary gear 48 comprises a gear train 2 and two parallel arrays of satellite gears 30, 31, which are located on opposite axial sides with respect to a plane of symmetry perpendicular to axis A, and define respective torque transfer paths to transmit respective torque fractions, as will also be explained hereinafter.

The satellite gears 30, 31 are supported by the gear train 2 so as to rotate on themselves about respective axes B, which are parallel to and eccentric with respect to axis A, and, at the same time, about axis A, according to a mode of operation distinctive of planetary gears. The toothing of the satellite gears 30, 31 is cylindrical and straight-toothed.

Each of the two arrays consists of at least three satellite gears 30, 31 (in this case five satellite gears 30, 31) angularly arranged about axis A. In particular, axes B of the satellite gears 30, 31 of each array are angularly evenly spaced from one another about axis A.

For each of the two arrays, the satellite gears 30, 31 directly engage respective sun gears 28, 29, which have the same shape and size and are arranged in aligned positions that are axially spaced apart.

The gear train 2 is defined by a monolithic body, i.e. a body made in one piece, is substantially bell-shaped and has an axial end which terminates with an abutment element 49, such as a flange. The abutment element 49 defines a coupling for connecting the gear train 2 in an angularly fixed manner to a member not shown, i.e. to another motion output member or to a static structure (also not shown). The gear train 2 has two end openings 5, 6, which are circular, coaxial with axis A and axially opposite to each other; the gear train 2 has a section transversal to axis A substantially circular in shape, with a diameter that increases starting from the opening 5 towards the opening 6.

The gear train 2 further defines, on the same side as the opening 5, five through openings 7, shaped as an arc of a circle, coaxial with axes B, angularly evenly spaced from one another about axis A, and angularly communicating with each other and with the opening 5 so as to define a single lobed opening 7a coaxial with axis A, whose lobes are defined by the openings 7 themselves (FIG. 5).

At the opposite axial end with respect to the abutment element 49, the gear train 2 comprises an annular portion 50 delimiting the lobed opening 7a.

With specific reference to FIG. 1, the gear train 2 also comprises an annular plate 51, which is coaxial with axis A, is connected to portion 50 by means of connecting portions 52 arranged angularly between the satellite gears 30, 31, and supports said satellite gears 30, 31 by means of respective pins 32, which protrude from the plate 51 in opposite directions along their axes B. In the specific example, the pins 32 are made in one piece with the plate 51, therefore they form part of the gear train 2.

According to a variant not shown, the pins 32 may be separate pieces that are fastened to the plate 51, for example by means of interference coupling.

The satellite gears 30, 31 are mounted on respective pins 32 via respective bearings, rolling bearings 33, 34, of the known type, and not described in detail.

Figure 2:
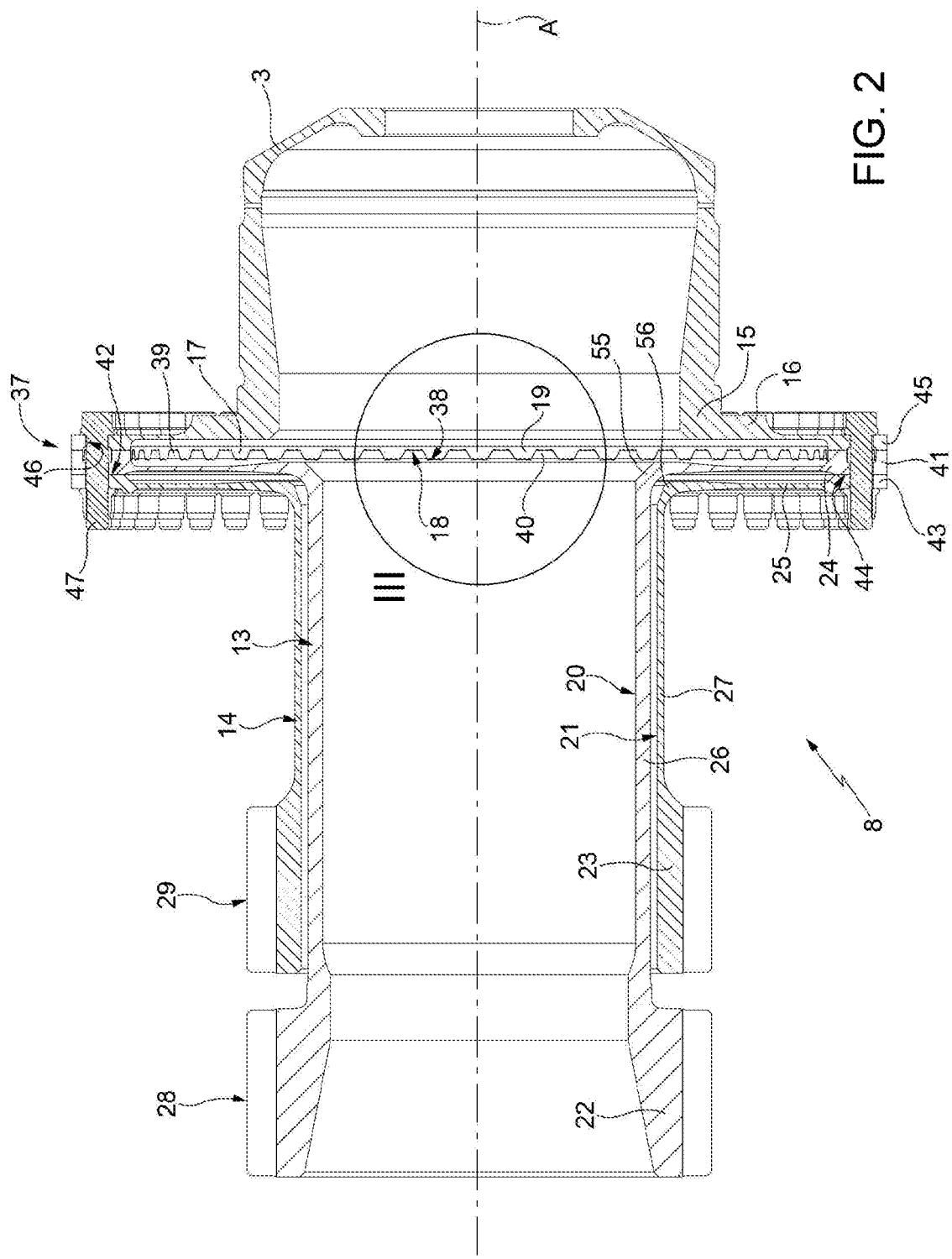
FIG. 2 is a larger-scale axial section of a detail of the gear transmission of FIG. 1.
Figure 3:
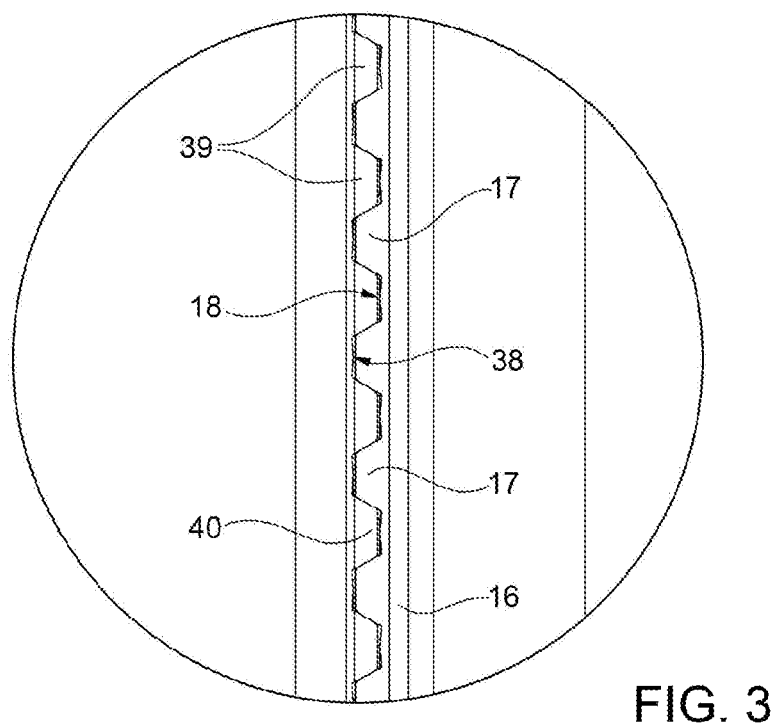
FIG. 3 is a larger-scale view of a detail of FIG. 2.
Figure 4:
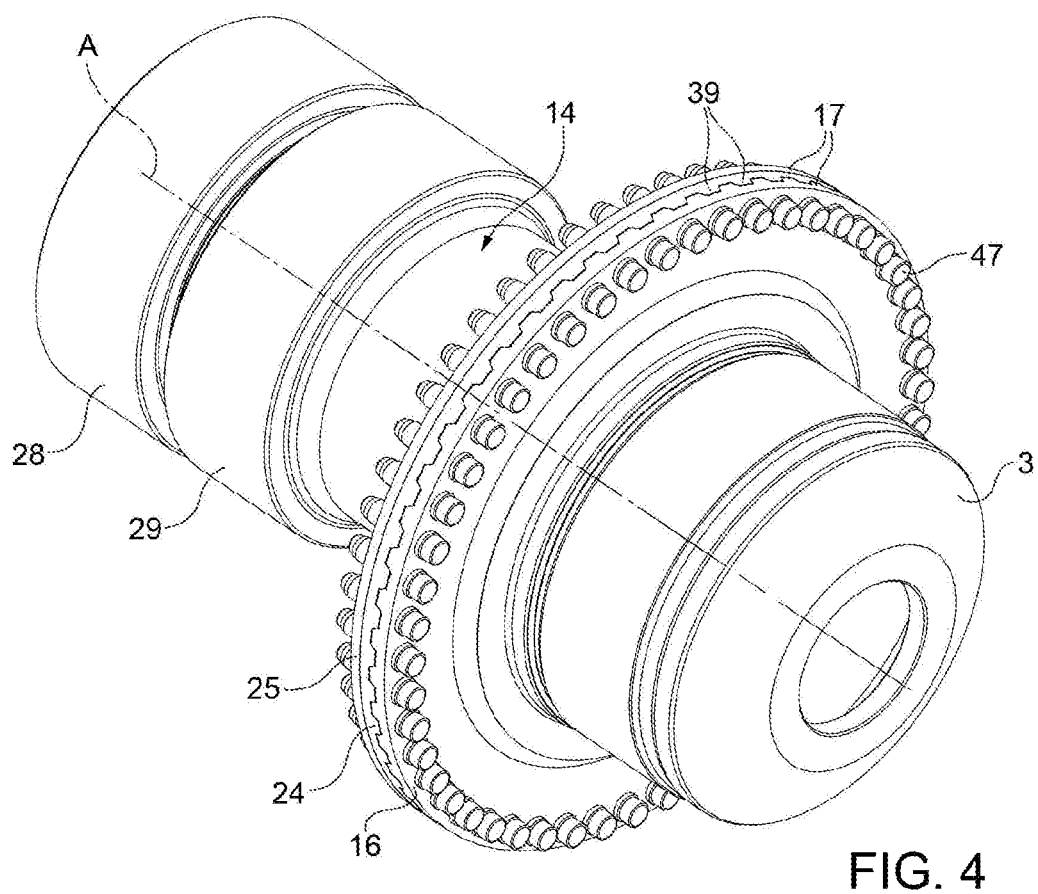
FIG. 4 is a perspective view, with parts removed for clarity, of the detail of FIG. 2.

With reference to FIG. 2, the input shaft 3 is axially hollow and is supported by the drive unit referred to above so as to rotate angularly about axis A in an axially fixed position. The input shaft 3 comprises, at one of its axial ends 15, a flange 16, the function of which will be clarified in the following, which extends radially outwards in a direction transversal to axis A and is peripherally delimited by a radial end 45.

The output shaft 4 (FIG. 1) is axially hollow, is coaxial with axis A and can be coupled, at one end thereof 9, to the propeller (not shown), according to a known configuration which is not described in detail.

The output shaft 4 comprises a portion 10 arranged on the outside of the gear train 2, and a portion 11 housed inside the gear train 2, substantially cylindrical in shape and with a greater diameter than the diameter of the portion 10; the portion 11 is integrally formed, in the example of FIG. 1, with the portion 10 by means of an annular wall 36 extending radially from the portion 10 to the portion 11.

The planetary gear 48 also comprises a crown 35 coaxial with the gear train 2, which is housed inside the gear train 2 and is in an embodiment, but not necessarily, integrally formed with the output shaft 4. In the illustrated case, the crown 35 is defined by the portion 11 of the output shaft 4 and is thus integrally formed with said output shaft 4 via the annular wall 36. The crown 35 is provided with a pair of internal teeth 12, each of which is adapted to engage the corresponding array of satellite gears 30, 31.

The particular bell shape provides the crown 35 with a certain degree of flexibility with respect to axis A, which allows any misalignments, due to the loads, between the various component parts of the transmission 1 to be minimized.

With reference to FIG. 2, the input shaft 3 axially precedes, along the load transmission direction, the motion transfer group 8, which initially divides the torque received by the drive unit into two fractions, which are as identical as possible to each other, and transfers such torque fractions to the two arrays of satellite gears 30, 31, respectively, via the sun gears 28, 29.

The group 8 comprises a first and a second transmission shaft 13, 14, which are coaxial with axis A (at least at the design stage) and arranged one (13) inside the other (14) with a certain radial clearance, and carry, at one of their axial ends, the sun gears 28, 29, respectively. In the example of FIG. 2, the sun gear 28 protrudes radially outwards from an end portion 22 of the transmission shaft 13 and is made in one piece with said portion 22. Similarly, the sun gear 29 protrudes radially outwards from an end portion 23 of the transmission shaft 14 and is made in one piece with said portion 23.

The transmission shafts 13, 14 have respective torsional stiffnesses established at the design stage, advantageously equal to each other, so as to transmit the torque in fractions that are as identical as possible to each other.

The sun gear 28 and the transmission shaft 13 integral therewith receive the torque from the flange 16 of the input shaft 3 at a respective rotating member, in the illustrated case defined by an end flange 24 of the transmission shaft 13 itself.

The sun gear 29 and the transmission shaft 14 integral therewith receive the torque from the flange 24 of the transmission shaft 13 at a respective rotating member, in the illustrated case defined by an end flange 25 of the transmission shaft 14 itself.

In practice, the flange 24 is interposed along the axis A between the flange 16 of the input shaft 3 and the flange 25.

The sun gear 28 and the transmission shaft 13 with its flange 24 define a first stage 20 that splits the torque received from the flange 16 of the input shaft 3.

The sun gear 29 and the transmission shaft 14 with its flange 25 define a second stage 21 that splits the torque received from the first stage 20.

Each flange 24, 25 is arranged on the outside of the gear train 2, is made in one piece on the free end of the respective transmission shaft 13, 14, and is arranged on the axially opposite side with respect to the corresponding portion 22, 23.

Each transmission shaft 13, 14 has a central portion 26, 27 substantially cylindrical in shape, formed integrally with both the respective portion 22, 23 and the respective flange 24, 25, and arranged partly outside and partly inside the gear train 2.

In other words, each transmission shaft 13, 14 with its respective flange 24, 25 defines a single element with the respective sun gear 28, 29.

The transmission shaft 14 is axially hollow, and the transmission shaft 13 is mounted through the transmission shaft 14 itself. In particular, the central portion 26 of the transmission shaft 13 has an outside diameter smaller than the inside diameter of the central portion 27 of the transmission shaft 14 and is housed with a certain amount of radial clearance inside the latter. In an embodiment, the transmission shaft 13 is also axially hollow.

At the axially opposite ends with respect to the sun gears 28, 29, the transmission shafts 13, 14 are provided with respective connecting portions 55, 56, facing each other and spaced apart from each other, which integrally connect the central portions 26, 27 to the respective flanges 24, 25.

The flanges 24, 25 define, together with the flange 16 of the input shaft 3, a coupling 37 that connects the transmission shafts 13 and 14 to said input shaft 3 (i.e. the input shaft 3 to the transfer group 8), which is designed to transmit the torque delivered by the drive unit to the group 8.

In particular, the flange 16 of the input shaft 3 and the flange 24 of the transmission shaft 13 cooperate with each other at respective annular interaction surfaces 18, 38 coupled frontally and extending perpendicularly to axis A.

Advantageously, the interaction surface 18 of the flange 16 of the input shaft 3 is frontally and peripherally provided with at least one circumferential series of frontal teeth 17 angularly evenly spaced from one another on the interaction surface 18 itself around axis A and axially protruding towards the flange 24; the teeth 17 define between them respective seats 19, which are consequently angularly evenly spaced from one another on the interaction surface 18 around axis A.

Similarly, the interaction surface 38 of the flange 24 of the transmission shaft 13 is frontally and peripherally provided with at least one circumferential series of frontal teeth 39, which axially protrude towards the flange 16 and are angularly evenly spaced from one another around axis A on the interaction surface 38 itself; the teeth 39 define between them respective seats 40, which are consequently angularly evenly spaced from one another on the interaction surface 38 around axis A.

Advantageously, the teeth 17 of the flange 16 of the input shaft 3 are complementary to the seats 40 of the flange 24 of the transmission shaft 13, and the teeth 39 of the flange 24 are complementary to the seats 19 of the flange 16 of the input shaft 3. In this way, a frontal clutch coupling between the input shaft 3 and the transmission shaft 13 is defined, through which the totality of the torque delivered by the drive unit is transmitted.

It should be noted that in the present description and in the claims the term "clutch coupling" refers to the reciprocal interpenetration of the teeth 17, 39 in the respective seats 19, 40.

The flange 24 of the transmission shaft 13 and the flange 25 of the transmission shaft 14 cooperate with each other peripherally at respective annular friction surfaces 42, 44 coupled frontally and extending perpendicularly to axis A.

In particular, the friction surface 42 is formed at a radial end 41 of the flange 24 and is arranged on the axially opposite side with respect to the interaction surface 38; likewise, the friction surface 44 is formed at a radial end 43 of the flange 25 and faces the friction surface 42 frontally.

The friction surfaces 42, 44 define a frontal friction coupling between the transmission shaft 13 and the transmission shaft 14 (and therefore between stage 20 and stage 21), through which a fraction of the torque from the input shaft 3 is transmitted via the clutch coupling between the flange 16 and the flange 24 of the transmission shaft 13.

The ends 41, 43 and 45 are also equipped with a series of axial through holes 46 angularly evenly spaced from one another around axis A and housing, on the inside, respective bolts 47; these bolts 47 are adapted to tighten in an axially fixed position the flanges 24, 25 and 16 of the coupling 37.

In use, the torque delivered by the drive unit and entering the input shaft 3 is transmitted to the transfer group 8, which splits it, via the two stages 20, 21, and subsequently via the planetary gear 48, into distinct fractions; the torque fractions are then conveyed through the crown 35 to the output shaft 4, with which they reunite as parts of an output torque, subsequently sent via the output shaft 4 itself to the propeller.

In particular, when the drive unit is activated, the torque is transmitted to the input shaft 3 and from the latter to the transmission shafts 13, 14 via (in order of transmission): the front teeth 17, 39 mutually engaged and complementary to the respective seats 19, 40 of the flanges 16, 24 which make up the clutch coupling of the input shaft 3 to the transmission shaft 13 (and therefore to the first stage 20); and the friction surfaces 42, 44 arranged at the radial ends 41, 43 of the flanges 24, 25 which make up the friction coupling of the transmission shaft 13 to the transmission shaft 14 (and therefore to the second stage 21).

The transmission shafts 13, 14 deform torsionally and, as their torsional stiffnesses are suitably calibrated, transmit, at regime conditions, respective torque fractions to the respective sun gears 28, 29 equal to each other, unless small differences due to errors in manufacturing and assembly of the components involved. Each torque fraction is then transmitted from the respective sun gear 28, 29 to the arrays of satellite gears 30, 31 with which it is engaged. Consequently, the torque fraction transmitted from each sun gear 28, 29 is split into fractions equal to each other on their respective satellite gears 30, 31, again unless small differences due to errors in manufacturing and assembly of the components involved.

In the illustrated case, in the area where each sun gear 28, 29 engages respective satellite gears 30, 31, the respective torque fraction is split into five fractions, which run through the planetary gear 48 along respective branches of the corresponding transmission path, which are defined by the respective satellite gears 30, 31.

Once in rotation, the satellite gears 30, 31 drag along with them the respective pins 32, and the torque fractions can merge on the crown 35 through the meshing of the teeth of the satellite gears 30, 31 with the internal teeth 12 of said crown 35 and, through the latter, reunite on the output shaft 4. The resulting torque at the output shaft 4 is then transmitted to the propeller.

The advantages enabled by the transmission 1 manufactured according to the present invention will be apparent from an examination of the features thereof.

In particular, thanks to the clutch coupling between the flanges (16, 24) transmitting the whole torque, the problems described above related to the presence, in operation, of an oil mist within the coupling 37 can be prevented.

Therefore, the torque transmitted being equal, a coupling 37 of smaller radial dimensions is required than the case in which the whole torque is transmitted through a friction coupling; this consequently allows an increase in the relative power density (ratio between the transmitted power and the volume of the coupling 37), as well as extremely low weights.

It is clear that the transmission 1 described and illustrated herein can be subject to modifications and variations without however departing from the scope of protection defined by the claims.

What I claim is:

1. A gear transmission for aeronautical applications comprising:
   an input shaft rotatable around an axis;
   an output shaft rotatable around the axis;
   a transfer group for transferring a torque from said input shaft to said output shaft;
   wherein said transfer group comprises a first torque splitting stage, receiving the torque entered from said input shaft, and a second torque splitting stage, receiving the torque entered from said first torque splitting stage; said first torque splitting stage presenting at least one first rotating member and said second torque splitting stage presenting at least one second rotating member;
   said input shaft and said at least one first rotating member cooperating with one another at respective interaction surfaces coupled frontally, the interaction surfaces extending transversely to said axis; and
   said at least one first rotating member and said at least one second rotating member cooperating with one another at respective friction surfaces coupled frontally, the friction surfaces extending transversely to said axis,
   wherein one of said interaction surfaces comprises first engagement elements, and another of said interaction surfaces comprises second engagement elements complementary to said first engagement elements, said first and second engagement elements being clutch coupled to one another.

2. The gear transmission according to claim 1, wherein said first engagement elements are first front teeth, separated from one another by respective first seats; and wherein said second engagement elements comprise second seats complementary to said first front teeth, said second seats being separated from one another by respective second front teeth; and said second front teeth and said first seats also being complementary to one another.

3. The gear transmission according to claim 1, wherein said transfer group further comprises a planetary gear interposed between said input shaft and said output shaft; said first torque splitting stage comprising a first sun gear angularly movable with said first rotating member and engaging a plurality of respective satellite gears; and wherein said second torque splitting stage comprises a second sun gear angularly movable with said second rotating member and engaging a plurality of respective satellite gears.

4. The gear transmission according to claim 3, wherein said first sun gear and said second sun gear are joined together with said at least one first rotating member and said at least one second rotating member, respectively.

5. The gear transmission according to claim 3, wherein said first sun gear and said second sun gear and said at least one first rotating member and said at least one second rotating member are coaxial with one another.

6. The gear transmission according to claim 3, wherein said transfer group comprises two torque transmission shafts, said torque transmission shafts being hollow and placed one inside the other with a certain radial clearance; and each of said transmission shafts carrying, at one own axial end, one of said first and second sun gears and at one opposite axial end one of said at least one first and second rotating members.

7. The gear transmission according to claim 6, wherein said first and second rotating members define respective flanges of said transmission shafts; wherein said input shaft presents a further flange; and wherein said flanges are connected in an axially fixed position by means of a plurality of bolts.

8. The gear transmission according to claim 1, wherein all the torque entering from said input shaft is transmitted to said first torque splitting stage by means of said first and second engagement elements.

9. The gear transmission according to claim 1, wherein a fraction of the torque received from said first torque splitting stage is transmitted to said second torque splitting stage by means of said friction surfaces.

* * * * *